United States Patent [19]

Weber et al.

[11] Patent Number: 5,753,199
[45] Date of Patent: May 19, 1998

[54] PROCESS FOR THE PRODUCTION OF CALCIUM CYANAMIDE FROM UREA

[75] Inventors: Günter Weber, Tacherting; Jürgen Graefe, Trostberg; Hubertus Klima, Siegsdorf; Johann Wolferstetter, Trostberg, all of Germany

[73] Assignee: SKW Trostberg Aktiengesellschaft, Trostberg, Germany

[21] Appl. No.: 714,067

[22] PCT Filed: Mar. 2, 1995

[86] PCT No.: PCT/EP95/00771

§ 371 Date: Sep. 11, 1996

§ 102(e) Date: Sep. 11, 1996

[87] PCT Pub. No.: WO95/24358

PCT Pub. Date: Sep. 14, 1995

[30] Foreign Application Priority Data

Mar. 11, 1994 [DE] Germany .................. 44 08 271.1

[51] Int. Cl.⁶ ........................................... C01C 3/16
[52] U.S. Cl. ............................................... 423/368
[58] Field of Search ....................................... 423/368

[56] References Cited

U.S. PATENT DOCUMENTS

| | | | |
|---|---|---|---|
| 2,632,687 | 3/1953 | Walter | 423/368 |
| 3,173,755 | 3/1965 | Picard et al. | 423/368 |
| 3,235,340 | 2/1966 | Kaess et al. | 423/368 |
| 3,499,726 | 3/1970 | Scheinost | 423/368 |

FOREIGN PATENT DOCUMENTS

| | | | |
|---|---|---|---|
| 2640610 | 6/1990 | France | 423/368 |
| 577340 | 5/1933 | Germany . | |
| 4420750 | 12/1994 | Germany | 423/368 |
| 49-37918 | 10/1974 | Japan | 423/368 |
| 248641 | 9/1976 | Russian Federation | 423/368 |
| 1333638 | 8/1987 | Russian Federation | 423/368 |

*Primary Examiner*—Wayne Langel
*Attorney, Agent, or Firm*—Felfe & Lynch

[57] ABSTRACT

Disclosed is a process for producing calcium cyanamide by reacting urea with an oxygen-containing calcium compound in at least two steps a) in a first step the reaction components are allowed to react under compression and/or while being revolved or by applying them to a hot surface at temperatures of 120° to 500° C. until a solid is formed and b) the solid reaction mixture that is formed is subsequently calcined at temperatures of 600° to 900° C.

In this process it is possible to obtain high yields and throughputs of calcium cyanamide without requiring a time-consuming processing of the reaction product after the first or second step.

21 Claims, No Drawings

PROCESS FOR THE PRODUCTION OF CALCIUM CYANAMIDE FROM UREA

BACKGROUND OF THE INVENTION

The invention concerns a process for the production of calcium cyanamide (lime nitrogen) from urea and a calcium compound containing oxygen.

The large-scale production of lime nitrogen has previously been achieved by azotization of calcium carbide. As an alternative to this, processes are already known which are based on the reaction of urea with compounds containing calcium. Thus a two-step process is known from SU-PS 812 713 in which urea is first reacted with calcium oxide or calcium oxide hydrate at an increased temperature and subsequently the calcium cyanate that is formed is calcined. A disadvantage of this process is the time-consuming purification of the intermediate.

The process according to SU-PS 1 333 638 appears to be much more simple in which the reaction of calcium oxide or calcium hydroxide with urea is carried out at 130 to 220° C. in an inert organic medium. Subsequently the reaction mass is heated at 700° to 900° C. Yields of calcium cyanamide of about 80 to 90% are achieved using this process, the content of cyanamide nitrogen being 28 to 32% N.

Approximately comparable yields are obtained according to the process of the French Patent Application 2 640 610 according to which 1 mole calcium carbonate is reacted with 2 mole urea at a temperature of 135 to 200° C. Subsequently, the reaction mixture is subjected to a further temperature treatment between 300° and 500° C.

It is either very difficult or not possible at all to carry out all these said processes on a technical scale because, in part, very complicated processing steps are necessary which appear to be extremely problematic also with regard to the profitability of these processes.

The object of the invention is therefore to provide a process for the production of calcium cyanamide by reacting urea and an oxygen-containing calcium compound in at least two steps which does not have the said disadvantages of the state of the art but ensures high yields of calcium cyanamide in a technically simple manner.

SUMMARY OF THE INVENTION

The above-stated object is achieved according to the process of the invention wherein:

a) in a first reaction step the reaction components are allowed to react under compression and/or while being revolved or by applying them to a hot surface at temperatures of 120° to 500° C. until a solid is formed and b) the solid reaction mixture that is formed is subsequently calcined at temperatures of 600° to 900° C.

Surprisingly, the process of the invention provides high yields of calcium cyanamide without requiring a complicated processing of the reaction product after the first or second step. In addition high throughputs can be achieved by the process according to the invention due to the short reaction period which was also not foreseeable.

DESCRIPTION OF PREFERRED EMBODIMENT

The process according to the invention includes at least two reaction steps. In the first reaction step urea and the oxygen-containing calcium compound are reacted together at temperatures of 120° to 500° C., preferably 150° to 400° C. In this case burnt lime (calcium oxide ($CaO$)), calcium hydroxide ($Ca(OH)_2$) or calcium carbonate ($CaCO_3$) and also calcium alcoholates primarily come into consideration as the oxygen-containing calcium compound. The calcium compound is preferably used with a particle size of 0.1 to 1.0 mm. According to a preferred embodiment calcium carbonate is used in a precipitated form which has a particle size of 1 to 200 µm and has a particularly pronounced reactivity due to being finely divided. It is possible in this case within the scope of the invention to use the precipitated calcium carbonate in an impure form as it for example is formed as a usually non-usable by-product in the further processing of lime nitrogen to cyanamide, dicyandiamide or thiourea. The molar ratio of the oxygen-containing calcium compound to urea can be varied within wide limits, however, it has proven to be particularly advantageous to set this molar ratio to 1:1 to 1:4.

An essential feature of the invention is that the reaction components are allowed to react in the first reaction step under compression or/and while being revolved or by application onto a hot surface. The compression or rotation of the reaction components can be preferably accomplished by carrying out the reaction in an extruder, kneader or rotary kiln whereby the oxygen-containing calcium compound and urea are preferably introduced as a mixture into the reactor used in each case. Conventional technical devices come into consideration as the extruder and kneader such as e.g. a screw extruder in the form of, for example, single or multiple screw extruders, or kneaders in the form of single, double or multishaft mixers. In these kneaders or extruders the reaction mixture is compressed, homogenized and at the same time transported. In this manner shifting, baking on etc. are also prevented in the reactor.

Instead of compressing and/or revolving the reaction components, the components can also be applied in the first reaction step to a hot surface which is preferably kept in motion. A technical method of realizing this variant of the process is to use a drum or band dryers on which the reaction components are applied. After the reaction is completed, the solid reaction product can then be mechanically removed again from the hot surface of the apparatus for example with the aid of scrapers, scratchers etc.. The first reaction step is carried out until formation of the solid occurs or until the generation of ammonia has ended. This is usually the case after 0.25 to 2 hours depending on the reaction temperature. The first reaction step a) is preferably carried out continuously.

In a preferred embodiment, the reaction components are converted completely or partially into a molten form before carrying out the first reaction step. It is expedient to accomplish this by heating the reaction components to a temperature of between 130° and 250° C. during which the reaction mixture at least partially melts and the desired reaction starts. This melting reaction of the starting products is preferably carried out in a heated tubular reactor and in particular in a heated screw conveyor or in a stirred tank. The residence time in these melting units is normally between 5 and 30 minutes depending on the size. This pretreatment of the reaction components enables a particularly rapid and complete conversion to the desired reaction product. The ammonia which is formed during this pretreatment step and also in the first reaction step can be collected and reused almost quantitatively.

In the second reaction step, the reaction mixture obtained in the first reaction step is then calcined at a temperature of 600° to 900° C. without further processing or purification. This reaction can be carried out in conventional devices such as e.g. a rotary kiln, settling furnace or even in a fluidized bed, continuous processing being preferred. If this second reaction step is carried out in a revolving tube, it is advisable to carry out the calcination in the presence of grinding balls composed of an inert material such as e.g. porcelain or steel which preferably have a diameter of 1 to 100 mm in order to comminute the material and to improve heat transfer. In order to avoid undesired side reactions which can lead to appreciable losses in yield, oxygen and water are preferably excluded in the second reaction step. Therefore the calcination is particularly preferably carried out under an inert gas atmosphere e.g. under nitrogen or out of contact with air under the waste gases of the reaction.

The second reaction step, which is usually also completed after 0.25 to 2 hours, yields calcium cyanamide in good purity and in high yields. The yields of calcium cyanamide are up to 97% and its content of cyanamide nitrogen is up to 34%. As a result of these good yields and the technically simple reaction procedures, the process according to the invention is particularly suitable for the technical scale.

It is intended to elucidate the invention in more detail by the following examples.

EXAMPLES

Example 1

500 g urea and the amount corresponding to the respective molar ratio (186 or 155 g) of calcium oxide (particle size <500 μm) were melted in a tubular reactor at 150° C. (residence time 7 minutes) and subsequently applied to a rotating roller dryer which had been heated to various temperatures as stated in Table 1. The solid reaction product that formed was scratched off with the aid of scrapers after a residence time of 10 minutes and then calcined for 1 hour in a rotating tube under a nitrogen atmosphere at a temperature of 750° C. The results are shown in Table 1:

TABLE 1

| Molar ratio CaO/urea | Temperature of the drum dryer | Yield of calcium cyanamide [g] | N content [weight %] |
| --- | --- | --- | --- |
| a) 1:2.5 | 380° C. | 232 | 30.6 |
| | 520° C. | 247 | 30.1 |
| b) 1:3.0 | 300° C. | 212 | 34.1 |
| | 280° C. | 210 | 33.8 |

Example 2

500 g urea and the amount corresponding to the respective molar ratio (233 or 186 g) of precipitated lime (particle size <200 μm) are melted down in a tubular reactor at 150° C. (residence time 12 minutes) and subsequently reacted for 1 hour at 350° C. in a rotating tube in the presence of porcelain balls (diameter 20 mm).

After the first reaction step is completed, the reaction product is calcined for 1 hour at 750° C. in a settling furnace under a nitrogen atmosphere. The results are shown in Table 2:

TABLE 2

| Molar ratio $CaCO_3$ : urea | Yield of calcium cyanamide [g] | N content [weight %] |
| --- | --- | --- |
| a) 1:2 | 281 | 29.5 |
| b) 1:3 | 290 | 30.1 |

Example 3

73 kg/h urea and 27 kg/h CaO are melted down in a stirred tank at ca. 160° C. (residence time ca. 10 minutes) and the melt is continuously rolled and compressed in a subsequent heated kneader. The temperature at the entrance of the kneader is ca. 235° C., and ca. 275° C. at the product discharge point. After a throughput of 1400 kg reaction mixture, 884 kg of product are obtained which is converted into a lime nitrogen with a nitrogen content of 30.0% by weight by calcination at 750° C. (20 minutes) in a rotating tube in the absence of air. The results are shown in Table 3. It will be understood that the specification and examples are illustrative but not limitative of the present invention and that other embodiments within the spirit and scope of the inventions will suggest themselves to those skilled in the art.

TABLE 3

| Molar ratio CaO : urea | Yield of calcium cyanamide | N content [weight %] |
| --- | --- | --- |
| 1:2.5 | 36.0 kg/h | 30.0 |

We claim:

1. A process for the production of calcium cyanamide by reacting as reaction components urea with an oxygen-containing calcium compound while heating wherein the reaction is carried out in two steps comprising:

a) in a first reaction step, reacting the components under compression and/or while being revolved or by applying them to a hot surface which is kept moving at a temperature of from 120° to 500° C. until a solid is formed; and b) in the second step, calcining the formed solid at a temperature of 600° to 900° C.

2. The process of claim 1 wherein the oxygen-containing calcium compound is at least one selected from the group consisting of burnt lime, calcium hydroxide, and calcium carbonate.

3. The process of claim 1 wherein the oxygen-containing calcium compound is precipitated calcium carbonate.

4. The process of claim 3 wherein the precipitated calcium carbonate is in an impure form.

5. The process of claim 1 wherein the molar ratio of oxygen-containing calcium compound to urea is 1:1 to 1:4.

6. The process of claim 1 wherein the first reaction step is carried out in an extruder.

7. The process of claim 1 wherein the first reaction step is carried out in a kneader.

8. The process of claim 1 wherein the reaction components in the first reaction step are applied to a hot surface and the formed solid is mechanically scraped off the surface.

9. The process of claim 8 wherein the hot surface is that of a drum or band dryer.

10. The process of claim 1 wherein the first reaction step a) is carried out continuously.

11. The process of claim 1 wherein the reaction components are completely or partially converted into a molten form by heating to temperatures of 130° to 250° C. before carrying out the first reaction step.

12. The process of claim 11 wherein the reaction components are melted in a heated tubular reactor or in a stirred tank.

13. The process of claim 1 wherein ammonia is formed in the first reaction step and is recovered and reused.

14. The process of claim 1 wherein the second reaction step is carried out in a rotating tube.

15. The process of claim 14 wherein the calcination in the rotating tube is carried out in the presence of balls made of an inert material.

16. The process of claim 1 wherein the second reaction step is carried out in a settling furnace.

17. The process of claim 1 wherein the second reaction step is carried out in a fluidized bed reactor.

18. The process of claim 1 wherein the second reaction step is carried out in the absence of oxygen and water.

19. The process of claim 18 wherein the second reaction step is carried out under an inert gas atmosphere.

20. The process of claim 1 wherein the second reaction step b) is carried out continuously.

21. The process of claim 12 wherein said tubular reactor is heated screw conveyor.

* * * * *